US011519696B2

(12) United States Patent
Smith

(10) Patent No.: US 11,519,696 B2
(45) Date of Patent: Dec. 6, 2022

(54) WAKE AND SUB-SONIC BLAST GUNSHOT DETECTION

(71) Applicant: THALES HOLDINGS UK PLC, Berkshire (GB)

(72) Inventor: Jonathan Neil Smith, Somerset (GB)

(73) Assignee: THALES HOLDINGS UK PLC, Berkshire (GB)

( * ) Notice: Subject to any disclaimer, the term of this patent is extended or adjusted under 35 U.S.C. 154(b) by 731 days.

(21) Appl. No.: 16/520,705

(22) Filed: Jul. 24, 2019

(65) Prior Publication Data

US 2020/0333110 A1 Oct. 22, 2020

(30) Foreign Application Priority Data

Jul. 24, 2018 (GB) ..................................... 1812064

(51) Int. Cl.
| | |
|---|---|
| *F41G 3/14* | (2006.01) |
| *G01S 5/28* | (2006.01) |
| *G01S 3/80* | (2006.01) |
| *G01S 5/18* | (2006.01) |
| *G01S 15/00* | (2020.01) |

(52) U.S. Cl.
CPC ................ *F41G 3/147* (2013.01); *G01S 3/80* (2013.01); *G01S 5/18* (2013.01); *G01S 5/28* (2013.01); *G01S 15/00* (2013.01)

(58) Field of Classification Search
CPC ... F41G 3/147; G01S 3/80; G01S 5/18; G01S 5/28; G01S 15/00; G01S 3/802; F41H 11/02
See application file for complete search history.

(56) References Cited

U.S. PATENT DOCUMENTS

| | | | | |
|---|---|---|---|---|
| 6,198,694 | B1 * | 3/2001 | Kroling | F41J 5/06 367/127 |
| 7,283,424 | B1 * | 10/2007 | Kuklinski | G01S 5/30 367/118 |
| 11,294,022 | B2 * | 4/2022 | Smith | F41H 11/00 |
| 2020/0110147 | A1 * | 4/2020 | Smith | G01S 3/8086 |
| 2020/0333110 | A1 * | 10/2020 | Smith | G01S 5/28 |

FOREIGN PATENT DOCUMENTS

| | | | | |
|---|---|---|---|---|
| AU | 2019208139 A1 * | 2/2020 | ............ | F41H 11/00 |
| AU | 2019208147 A1 * | 2/2020 | ............ | F41G 3/147 |
| CA | 3050434 A1 * | 1/2020 | ............ | F41H 11/00 |
| CA | 3050436 A1 * | 1/2020 | ............ | F41G 3/147 |
| EP | 3599479 B1 * | 4/2021 | ............ | F41G 3/147 |
| GB | 2575830 A * | 1/2020 | ............ | F41H 11/00 |

(Continued)

OTHER PUBLICATIONS

Duckworth et al., Fixed and wearable acoustic counter-sniper systems for law enforcement, Nov. 1998 (Year: 1998).*

(Continued)

*Primary Examiner* — Daniel Pihulic
(74) *Attorney, Agent, or Firm* — Hauptman Ham, LLP

(57) ABSTRACT

Trajectory estimate for a sub-sonic projectile can be derived from sampling a wake contribution of an acoustic signal detected at a multi-detector array. The wake contribution is sampled, in time, and the samples are processed to determine a bearing estimate for the projectile from which the acoustic wake derives.

9 Claims, 10 Drawing Sheets

(56) References Cited

FOREIGN PATENT DOCUMENTS

| GB | 2575831 A | * | 1/2020 | ............. F41G 3/147 |
| WO | 9316395 A1 | | 8/1993 | |
| WO | 9737194 A1 | | 10/1997 | |
| WO | 2006096208 A2 | | 9/2006 | |

OTHER PUBLICATIONS

Extended European Search Report from corresponding European Application No. 19187430.4, dated Dec. 17, 2019, pp. 1-8, European Patent Office, Munich, Germany.
United Kingdom Combined Search and Examination Report from corresponding Great Britain Application No. 1812064.2, dated Jan. 25, 2019, pp. 1-5, Intellectual Property Office, South Wales, United Kingdom.

* cited by examiner

WAKE AND SUB-SONIC BLAST GUNSHOT DETECTION

FIELD

Embodiments described herein relate to the detection of a projectile. Particularly, embodiments relate to ascertaining an estimate of the trajectory of a projectile.

BACKGROUND

Circumstances arise in which it is desirable to detect a projectile, and to determine, with reasonable certainty, an estimated source of the origin of the projectile.

Techniques exist for determining projectile trajectory for supersonic projectiles, using acoustic features such as a shockwave, produced by the motion of the projectile at a supersonic speed, and/or the sound of a muzzle blast.

For subsonic projectiles, such techniques are not available. For example, a revolver is a commonplace weapon which fires projectiles at a speed lower than the speed of sound in air, and the muzzle blast from such a revolver typically has a sound signature which is difficult to distinguish from other sounds found in nature, such as clapping hands, the slam of a shutting door, the ignition of a firework, or a solid object such as a lump of wood hitting a floor. Consequently, in the absence of a preceding shockwave, such as would be encountered with a supersonic projectile, muzzle blast is an unreliable indicator for projectile detection.

It is desirable to provide a means by which subsonic projectiles, and their trajectories, can be better detected.

FIGURES

DESCRIPTION OF EMBODIMENTS

In general terms, an embodiment as described herein comprises a gunshot sensor for determining the existence of a gunshot. From received information, the gunshot sensor can obtain an estimate of trajectory of a subsonic projectile.

The gunshot sensor of an embodiment comprises an acoustic sensor, operable to convert received acoustic oscillations into electrical signals, and a signal processor operable to process such electrical signals. The processing is capable of determining the signature of a wake of a projectile and, if discernible, the muzzle blast of a gun from which such a projectile has been fired.

On detection of a wake signature, subsequent processing of measurements of the wake signature and muzzle blast can determine an estimate of bearing and distance of origin of the projectile.

Aspects of embodiments disclosed herein provide acoustic frequency and trajectory information over time which can be used in a discrimination process, to determine to a degree of confidence that an acoustic feature is, for instance, that causal of a flying bullet, as opposed to background acoustic noise of any sort, such as a backfiring engine or a car door slamming. This information can then be used, optionally with muzzle blast information, to determine an estimate for a source direction of the detected bullet. This approach is suitable for subsonic projectiles, as it does not rely on shockwave processing, but it is not exclusively so, and acoustic features of supersonic projectiles can be processed in the same way.

Embodiments described herein may provide a desirable focus on avoiding false alarm, that is, determination that an acoustic feature is causal of a bullet when in fact it is not so caused.

Figure 1:
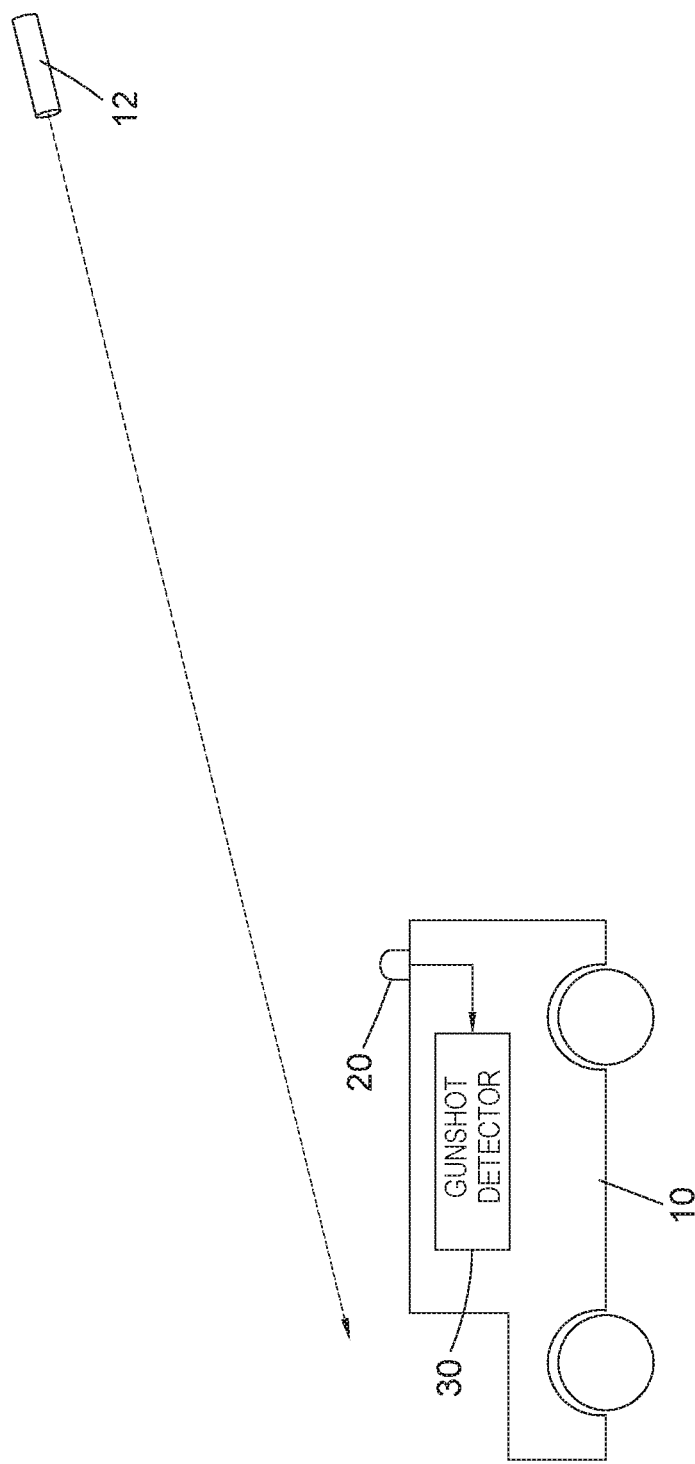
FIG. 1 is a schematic illustration of an implementation of an embodiment.

FIG. 1 illustrates an embodiment, in which a vehicle 10 is equipped with an acoustic sensor 20 connected to a gunshot detector 30. The gunshot detector 30 may, in certain embodiments, be connected to other on-board electronic equipment, such as a navigation system, so that the outcome of gunshot detection can be integrated with navigation data so as to present location information to a user.

A scenario is illustrated whereby a bullet is fired from a firearm 12. The trajectory of the bullet is illustrated in broken line.

Figure 2:
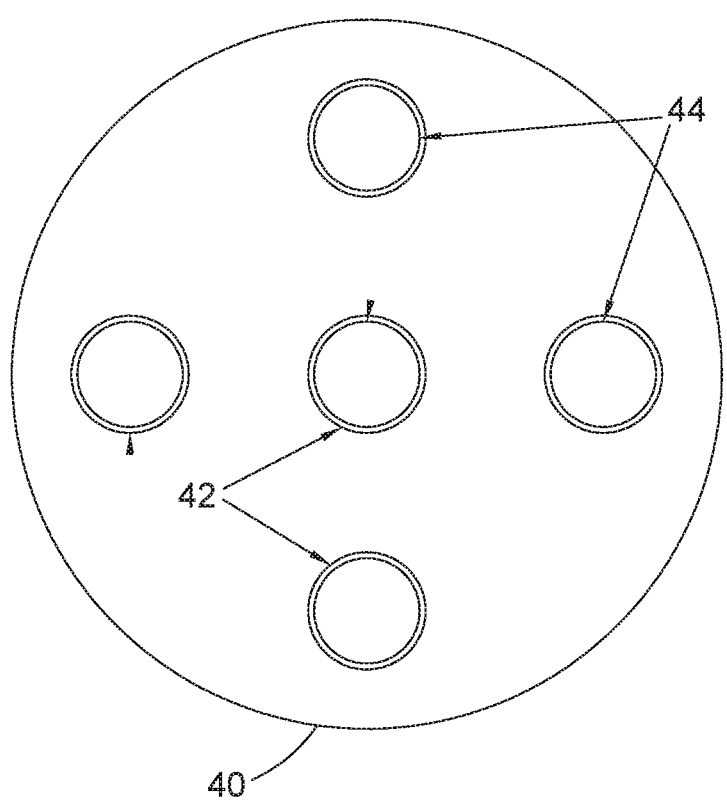
FIG. 2 is a plan view of a sensor plate of a sensor of the illustrated embodiment.

The acoustic sensor 20 is of known type, as described in European Patent Application EP2884762A1. The acoustic sensor 20 includes a circular sensor plate 40, as illustrated in FIG. 2. The sensor plate 40 has five through holes 42 defined therein. The through holes 42 are arranged in a cruciform formation, centred with the sensor plate 40. Each through-hole 42 has a microphone 44 mounted therein, oriented so as to be directed to detect sound emanating from the exterior of the acoustic sensor 20.

Each microphone 44 has an output connection (not shown), which are collectively indicated by an arrow extending from the acoustic sensor 20 to the gunshot detector 30.

Figure 3:
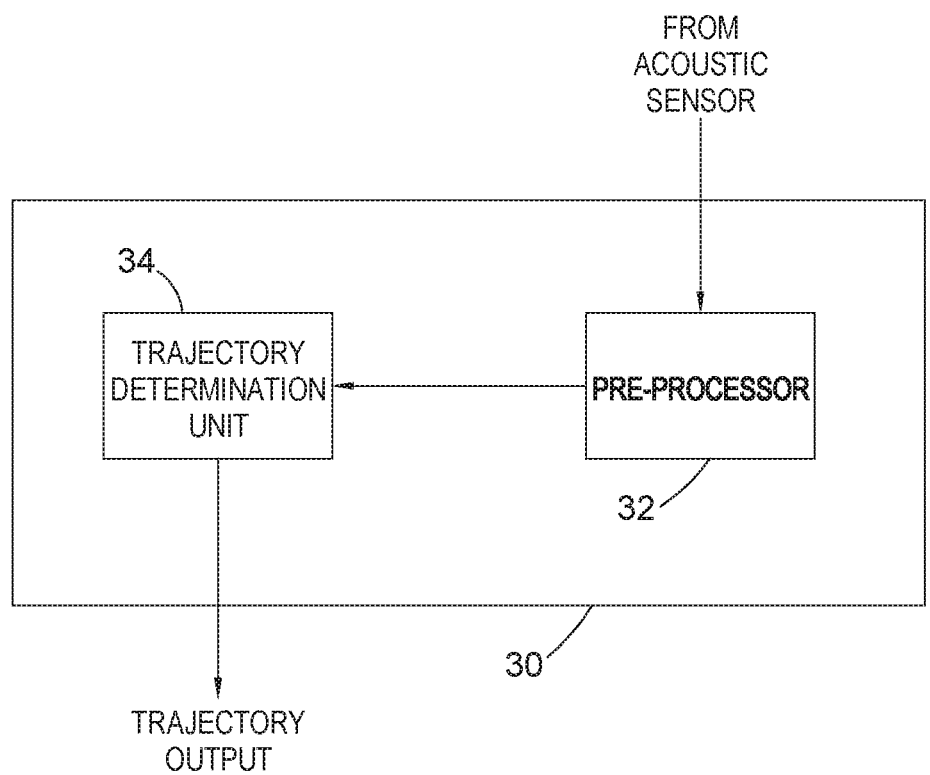
FIG. 3 is a schematic diagram of a gunshot detector of the illustrated embodiment.

The architecture of the gunshot detector 30 as illustrated in FIG. 3 is, generally speaking, composed of two stages. A first stage comprises a pre-processor 32 which receives the analogue feeds from the five microphones 44 of the acoustic sensor 20, and processes these into digitised representations of frequency and bearing information gained from the microphone outputs.

A second signal processing stage comprises a trajectory determination unit 34 which processes the digital information produced by the pre-processor 32 so as to produce a reading of trajectory information for a bullet as detected by the detector 30.

By way of background, when a projectile, such as a bullet, is shot from a firearm, and the firearm is configured to fire at a subsonic speed, then the sound associated with the shot will give rise to a number of discrete sounds detectable at the detector 30 as the projectile flies past:

1. Direct acoustic excitation associated with a muzzle blast;
2. The ground reflection of the muzzle blast;
3. The bullet's wake;

4. A sound associated with impact of the bullet on a target or other object;
5. In some circumstances, reflections other than ground reflections of the muzzle blast on other surfaces such as buildings or hillsides.

These effects are listed, broadly, in likely order of receipt at the detector 30. Of course, the reader will appreciate that the timing of reflections such as echoes is dependent on the specific environment.

In practice, the spectrum of the measured muzzle blast will be composed predominantly of low frequency oscillation. Often, it may be difficult to separate the direct arrival of the muzzle blast from ground reflections thereof.

Figure 4:
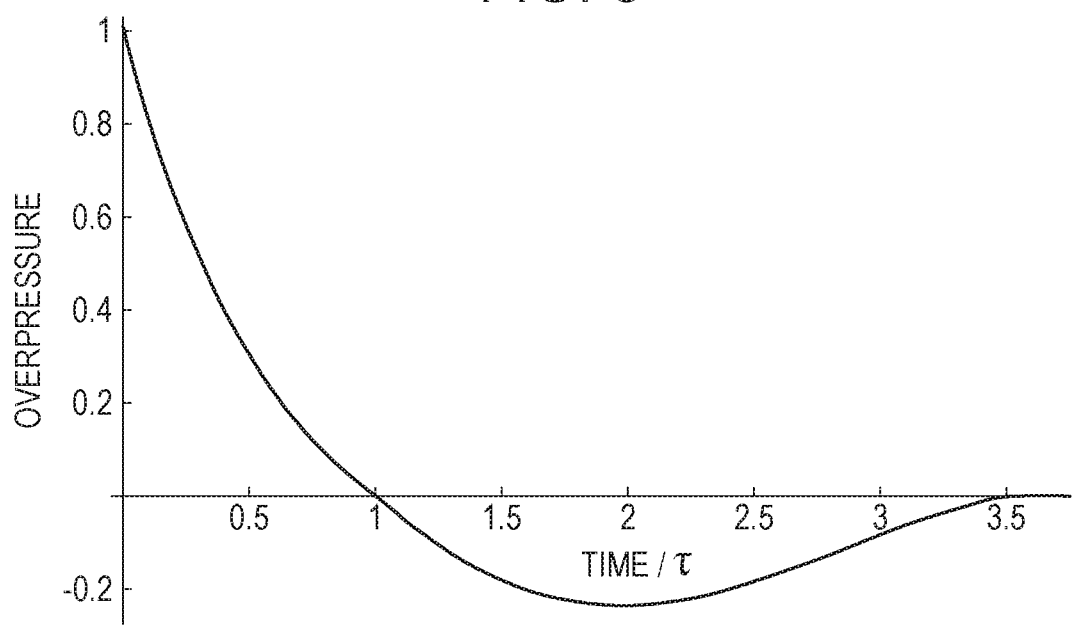
FIG. 4 is a graph of acoustic pressure against time illustrating an acoustic signature of a theoretical muzzle blast.

FIG. 4 illustrates a theoretical signature waveform for a muzzle blast, measuring acoustic overpressure in nominal units against time, again, in nominal units. It will be appreciated by the reader that a waveform with this clear signature will be rare in practical examples, but it provides the reader with teaching as to what features may characterise a muzzle blast signature.

As shown, the muzzle blast is characterised by a sudden step change in pressure, followed by a rapid drop to a pressure lower than equilibrium, then a decay back to the equilibrium pressure.

In practice, muzzle blast comprises emission of a bullet, followed closely by a blast of propulsive hot gas. This hot gas emerges at a supersonic speed behind the bullet, and thus generates a shockwave at its own leading edge. However, this shockwave is generally neglected in detection, for two reasons. Firstly, the shockwave initially already has an amplitude lower than that of the main blast pressure, which diminishes its discernibility. Secondly, the predominantly high frequencies it contains attenuate significantly with distance so that, when firing takes place tens of metres away from the detection point, the leading shockwave has substantially lost its identity by the time it reaches the acoustic sensor 20 to be picked up by the detector 30.

It has been found that, in practical circumstances, the low frequency waveform associated with a muzzle blast usually comprises three half cycles, often as a chirp, with each half-cycle longer than its predecessor. With some configurations, the second and third half-cycles can have the same duration.

Figure 5:
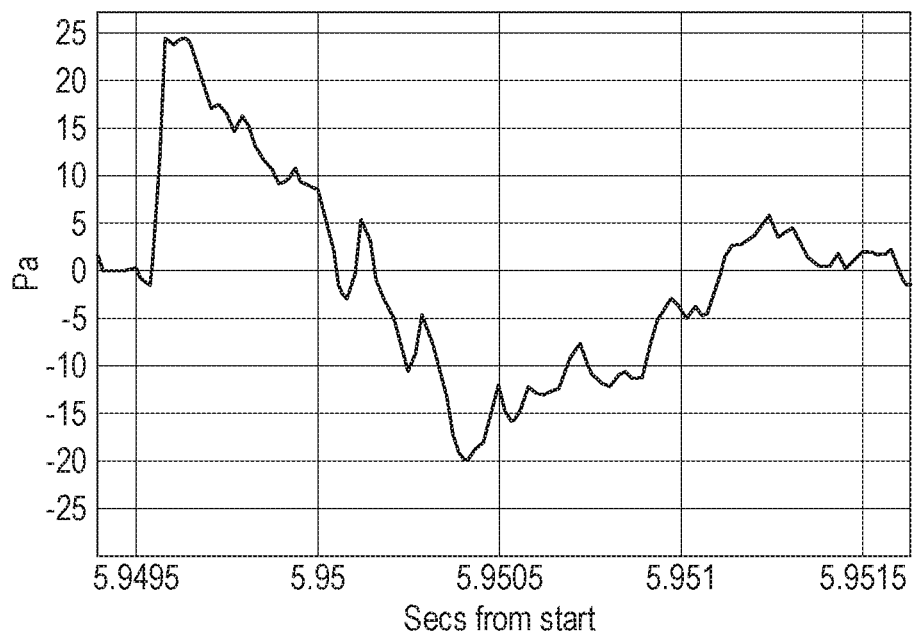
FIGS. 5 to 12 are graphs of acoustic pressure against time of various practical muzzle blast measurements.
Figure 6:
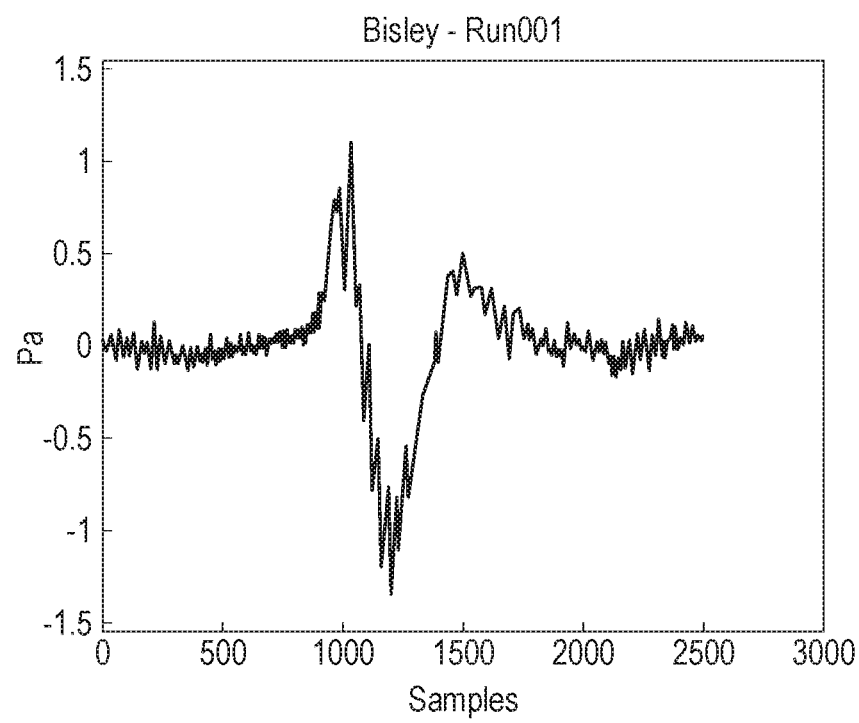
Figure 7:
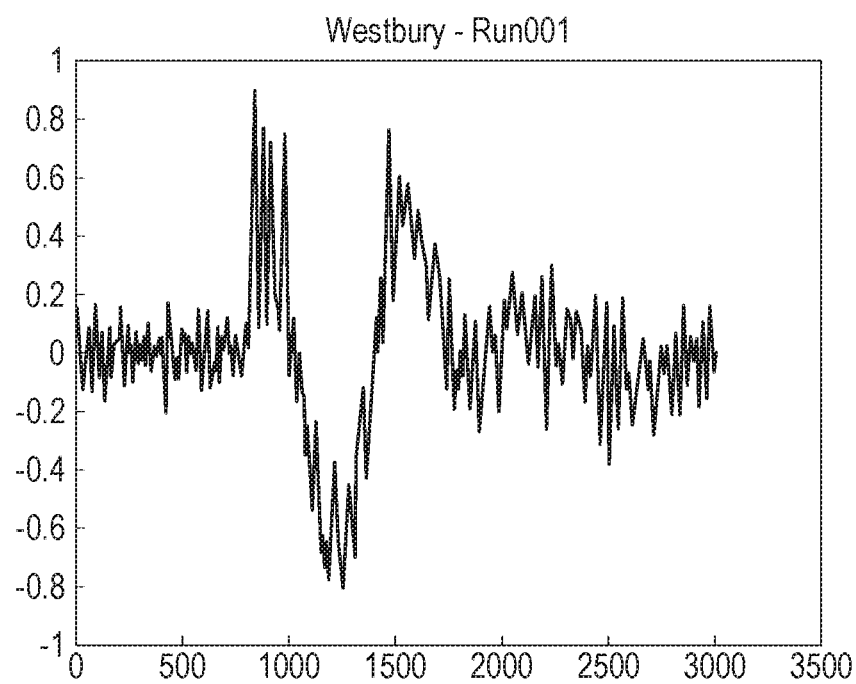
Figure 8:
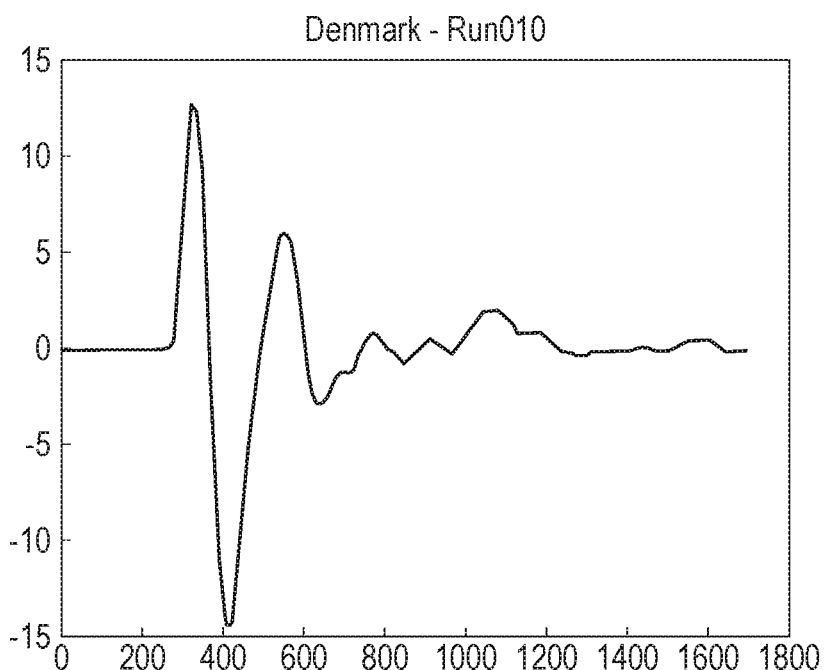
Figure 9:
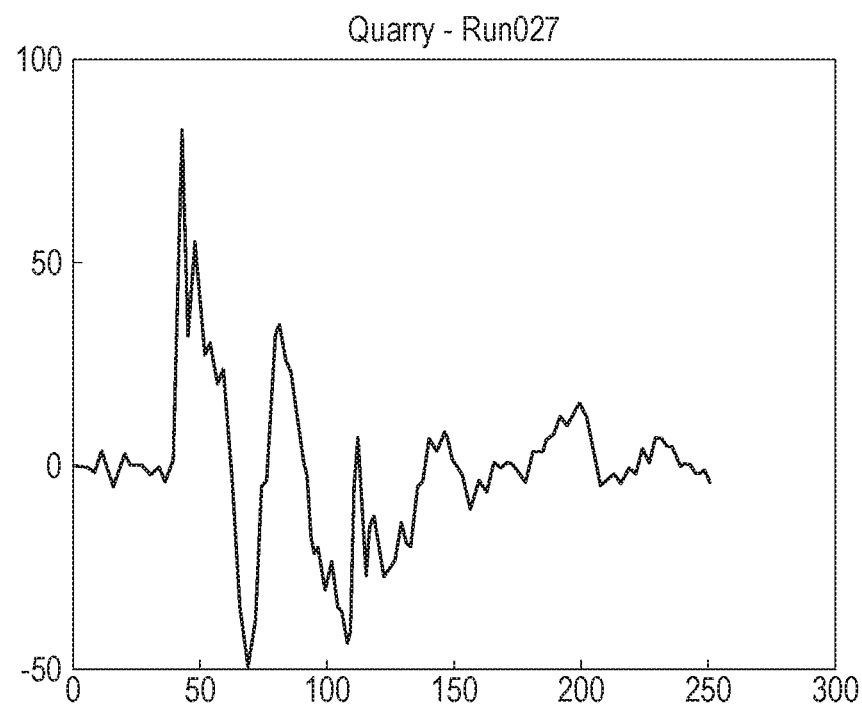
Figure 10:
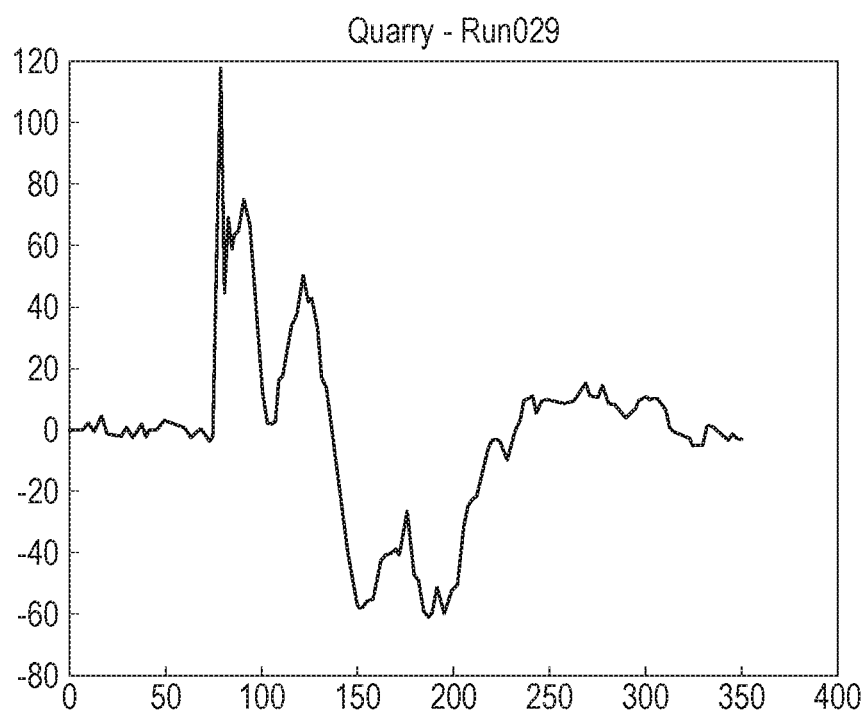

Further examples of practical muzzle blast detections are provided in FIGS. 5 to 12. FIG. 5 shows a blast from a [insert gun details here] in a quarry environment. This shows a profile substantially similar to theoretical prediction. FIGS. 6 to 9 show different muzzle blasts in different environments. FIG. 6 is of a shot fired over grass and, as can be seen, has a profile in which high frequency sounds are attenuated, particularly in contrast to the less acoustically absorbent environment of a quarry in FIG. 7. FIG. 8 shows a firing over ice, and the amplitude of the muzzle blast is notable. A similar profile is found in two more quarry firings in FIGS. 9 and 10.

Figure 11:
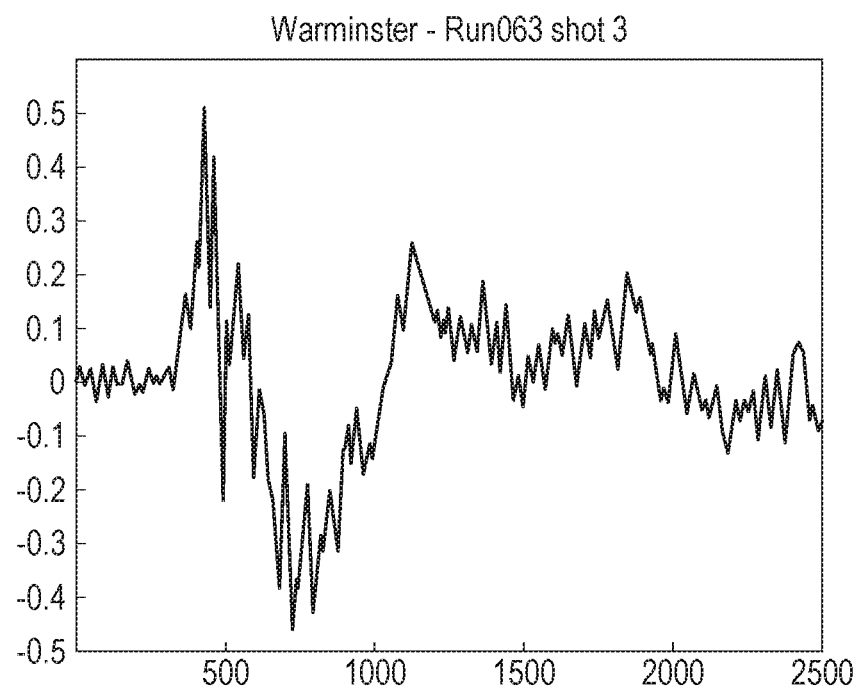
Figure 12:
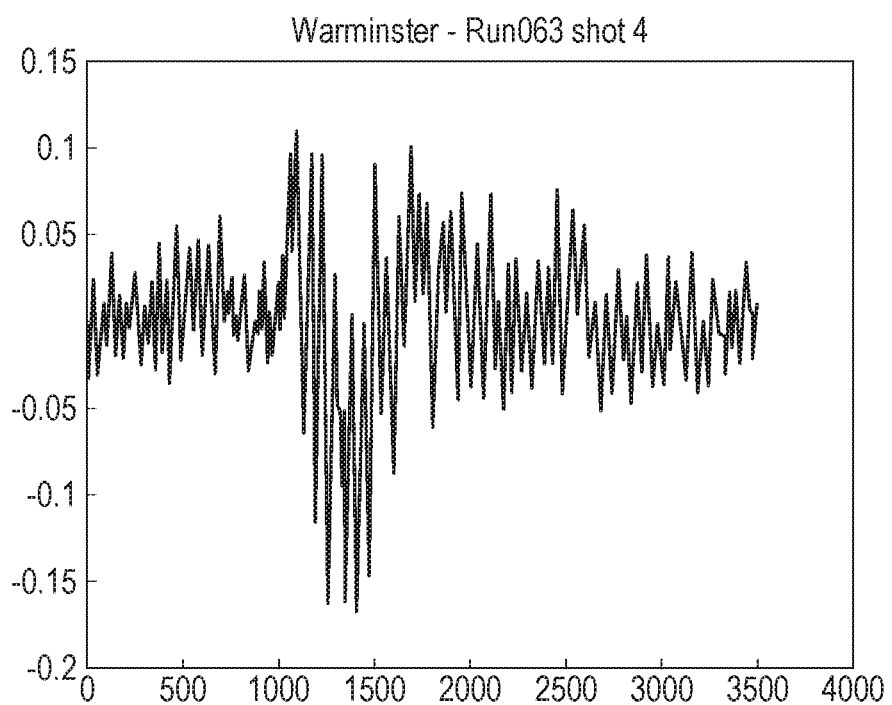

FIG. 11 is of a 0.762 gunshot, and FIG. 12 is of a 0.556 gunshot. As suggested by the amplitude axis, these were taken at long range.

These readings are illustrated to show that there is no evidence of correlation between the characteristic or structure of a muzzle blast waveform and the calibre of the firearm from which it emanates. It will also be apparent to the reader that the muzzle blast waveforms have a range of signatures. There are potentially some extractable features which may allow for partial classification, but the degree of certainty that can be attached to classification decisions will inevitably be poor.

Whereas, in previous approaches, muzzle blast alone was used to identify a gunshot event, embodiments disclosed herein employ detection of the sound of the bullet's wake as it flies past the acoustic sensor 20.

Figure 13:
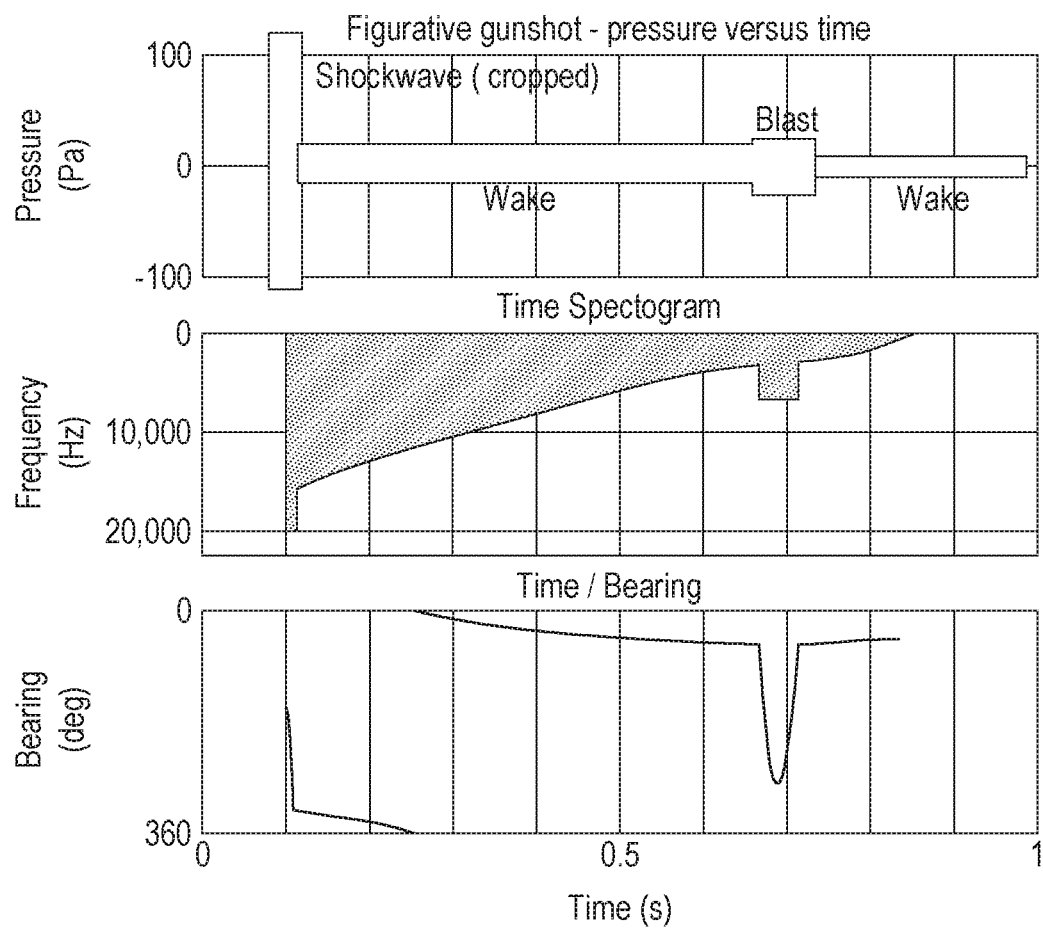
FIG. 13 is a plot showing detection data for acoustic signals resultant from passage of a bullet nearby an acoustic sensor.

FIG. 13 shows a three plot diagram illustrating signal analysis of a typical gunshot by the acoustic detector 30.

In the uppermost plot, a chart is plotted of pressure against time, showing the progression of acoustic features past the acoustic sensor 20. A shockwave is identifiable at 0.13 seconds time lapse, a blast is shown at 0.58 seconds, and a wake extends from 0.14 seconds to at least 0.4 seconds. In fact, the scaling of the plot conceals the duration of the wake, which extends considerably beyond that time.

The middle plot shows amplitude versus frequency versus time. The amplitude is coded by shading—darkest shades are loudest and lighter shades are quietest. The vertical axis indicates frequency and the horizontal axis represents time lapse. It can thus be seen that the wake (from 0.14 s) has substantial high frequency acoustic components.

The lowermost plot is a graph of bearing against time. This is calculated using the whole energy within a succession of time domain sample data blocks. Using an inverse tangent operation, such as the atan 2 function provided within the Matlab tool, these data blocks can be converted to a measure of bearing.

The reader will appreciate that, as a bullet passes by, it causes an acoustic effect, discernible to the human ear, which can be best described as a "fizzing" or "humming" sound. This sound is caused by cavitation behind the bullet, generating predominantly random noise. In the case of a bullet from a rifled bore, this will be modulated by the spin of the bullet—the spin rate will usually be a few hundred revolutions per second or faster. The audible wake is persistent, and can last for most of a second.

Figure 14:
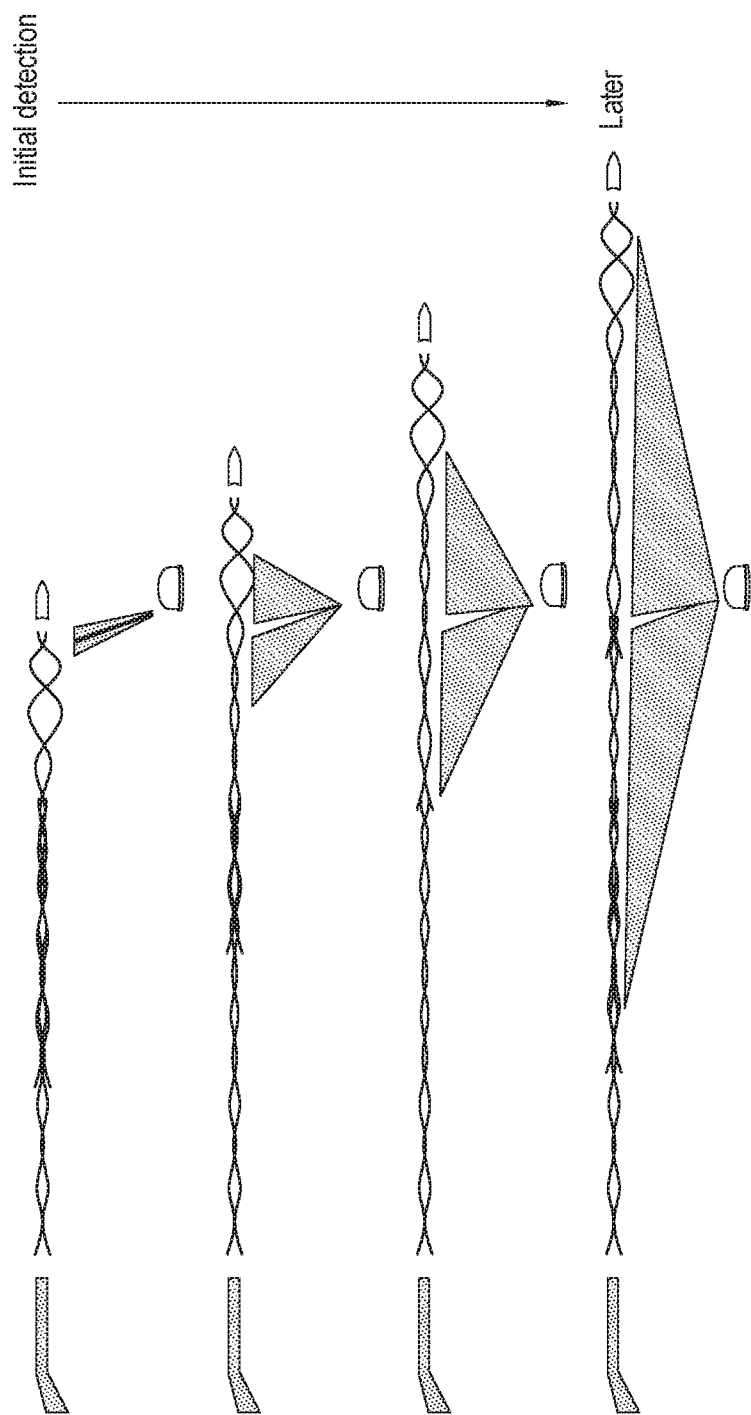
FIG. 14 is a plot illustrating schematically the passage of a bullet nearby a sensor.

FIG. 14 illustrates the passage, over four points of time, of a bullet past the acoustic sensor 20 and how this affects the acoustic signal received at that sensor over that time.

In the uppermost, first stage, the bullet has not yet reached the detection position. The acoustic wake signal received at the detector 30 in respect of the bullet in that position will therefore emanate from a single direction—the direction defined by a line between the cavitation region behind the bullet from which the wake sound is generated and the detector.

Thereafter, as time passes, the sound detected at the detector obtains contributions from earlier points in the trajectory, whose sound has now had time to arrive, and from later parts of the trajectory as the bullet continues on its path.

The past and future contributions are not symmetrical. Observing the path of the bullet as it moves beyond the detector towards the target, the bullet steadily decelerates, and its spin also decreases, resulting in the wake signal so generated reducing in amplitude. A steady reduction of spin tones and modulation frequencies can thus be expected.

On the other hand, looking at the progress of the bullet towards the point of detection, as it travels from the gun, the wake contribution would have been louder, due to the faster speed of the bullet (and faster spin). However, the wake contribution closer to the gun is older, and thus will have attenuated more before it reaches the detector.

It has been observed in trials that the wake contribution persists for some considerable time, and is detectable even after target strike.

The effect of this can be observed in FIG. 13. In the bearing plot, in the lowermost portion of the diagram, an initial (correct) bearing calculation then disappears for a period of time in which the forward and backward spatial contributions are of such similar magnitude that the bearing is irresolvable. After this gap, the contribution pointing towards the target dominates (the contribution prior to the detector, being earlier, has attenuated further), leaving a track whose asymptote is 180° from the direction of the firing gun. This is because there has been longer dissipation time for the trail back to the gun, than for the trail to the target.

It will be observed that a significant proportion of the energy in the acoustic signals is at relatively high frequencies (1 kHz to 20 kHz). This means that it is discernible from other noise sources, such as vehicle noise. This is useful, because the detector may in certain practical applications, be mounted on a vehicle, whose engine may be running during operation.

It is possible to simulate the wake of a bullet using white (Gaussian) noise, modulated at 220 Hz to 50% depth, setting initial amplitude to 4 Pa, linearly decreasing to zero at 1.0 seconds. Spatially, it should be modelled as the integration of the contributions from both paths (forward and backward). The limits of the integral diverge at the speed of sound, after the shockwave.

Figure 15:
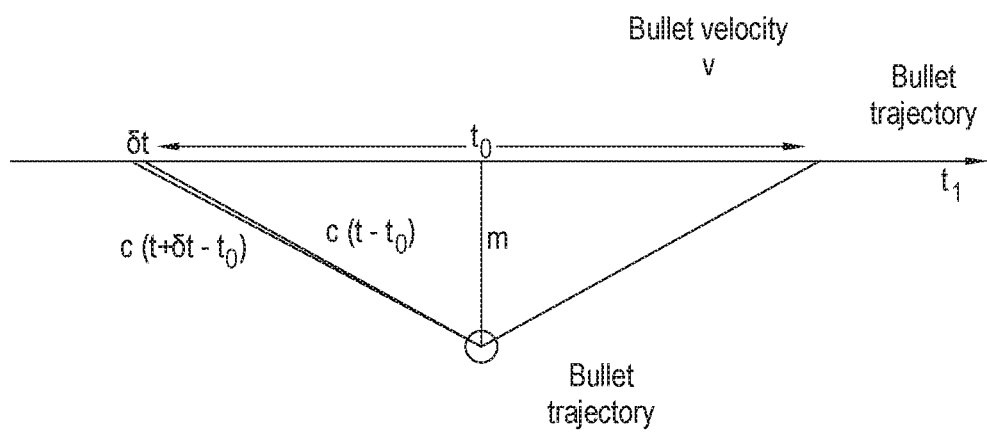
FIG. 15 is a diagram showing geometry supporting analysis to be carried out by the acoustic detector of the described embodiment.

FIG. 15 shows a diagram from which the following description will derive an analytical method for determining an estimate of bullet trajectory from detection and measurement of a wake acoustic contribution over time.

A bullet at time $t_1$ is considered. While the exact decay characteristic of a wake sound is not material to this disclosure, it is expected to be monotonic and, for the purpose of this analysis, is assumed to be exponential.

Then, the following quantities are defined:
P Pressure
t time
$t_0$ time of bullet's nearest approach to sensor
$t_1$ time now
$\Delta t$ time after $t_0$
m miss distance
c speed of sound
Thus, the wake sound takes the form:

$$P = P_0 \left(1 - e^{-\frac{(t-t_1)}{\tau}}\right)$$

So, the contribution from the indicated element length cot now has age ($\Delta t + t_1 - t_0$). Thus, the overall pressure becomes:

$$P = P_0 \left( \int_{t=t_0}^{\Delta t} \frac{\left(1 - e^{-\frac{(\Delta t + t_1 - t_0)}{\tau}}\right)}{\sqrt{c^2(\Delta t + t_1 - t_0)^2 - m^2}} + \int_{t=t_0}^{\Delta t} \frac{\left(1 - e^{-\frac{(-\Delta t + t_1 - t_0)}{\tau}}\right)}{\sqrt{c^2(-\Delta t + t_1 - t_0)^2 - m^2}} \right) \quad (1)$$

As the reader will appreciate, this shows that the dependency of the contribution on time is complex. However, some straightforward observations can be made.

In the long term, the contribution of the wake past the sensor, nearer to the target, dominates. This is represented by the right hand term in equation (1) above. In the short term, both contributions are roughly equal. Although the bullet may "race ahead", the integrated energy contributions nearer to the miss point, being close, would dominate. So, an imaginary "single point of emission" moves away from the miss point more slowly than the bullet does.

There are several ways of calculating the wake signal. An example of this is explained. Initially, time domain signals are obtained from every microphone. The continual stream can be divided into equal size blocks for further processing.

For each block of data, the bearing of an assumed plane-wave signal is derived, over a limited frequency range only. A typical frequency range is selected by high-pass filtering the signal above around 800 Hz. In the context of a real-life implementation whereby the sensor 20 is set on an automotive vehicle, this value enables exclusion of all the largest amplitude automotive sounds. Knowledge of the spatial arrangement of sensors enables determination of a vector of bearings and amplitudes versus time.

It is recognised that the frequency range over which the bearing derivation needs to operate, crosses the range in which there is less than, and more than, one wavelength difference between pairs of transducers.

Given that microphone positions are fixed, then a position matrix is constructed containing rows of coordinates. A pseudoinverse matrix is then constructed. A suitable approach to determination of the pseudoinverse matrix is the Moore-Penrose "Left divide" method. The derivation then continues in two phases, which can be considered as the correlation part, and the phase difference part.

Initially, a Fourier transform is carried out on all the time signals. One channel may be selected as a reference, and cross-spectra are generated between all other channels and this. These cross spectra are assembled into a cross spectrum matrix.

This is converted into a cross-correlation matrix by taking the real part of the inverse transform of the cross spectrum matrix.

As the microphone spacings are known, then a largest feasible delay is known, and the cross correlation can be limited in length to fit this value. Peaks therein provide the integer part of inter-microphone delays.

From this, a 'rotating vector' is generated with the same frequency shift between cells as the existing spectra. The cross spectrum matrix is then dot multiplied by the rotating vector.

The magnitude and unwrapped phase (which should not be wrapped at this point) are calculated, and thence the fractional delay (effect in frequency domain).

While certain embodiments have been described, these embodiments have been presented by way of example only, and are not intended to limit the scope of the inventions. Indeed, the novel systems, devices and methods described herein may be embodied in a variety of other forms; furthermore, various omissions, substitutions and changes in the form of the systems, devices and methods described herein may be made without departing from the spirit of the inventions. The accompanying claims and their equivalents are intended to cover such forms or modifications as would fall within the scope and spirit of the inventions.

The invention claimed is:
1. A method of detecting trajectory information for a subsonic projectile, comprising:
    collecting detection signals from an array of detection microphones, the detection microphones being established in a non co-linear spatial relationship with respect to each other;
    determining from at least one of the detection signals the existence of an acoustic waveform, including a wake contribution, characteristic of a persistent wake of a subsonic projectile passing on a trajectory nearby, and a muzzle blast waveform, characteristic of a muzzle blast;

obtaining a plurality of time samples of the wake contribution over a time period; and processing the plurality of time samples of the wake contribution and the detected muzzle blast waveform to determine geometric characteristics of the trajectory of the projectile.

2. The method in accordance with claim 1, wherein the collecting of detection signals comprises establishing an array of acoustic detectors, the detectors being spaced in a fixed disposition with respect to each other, and deriving an electrical signal at each acoustic detector corresponding to acoustic waves incident thereon.

3. The method in accordance with claim 2, wherein the array of acoustic detectors comprises at least three acoustic detectors in a non-collinear arrangement.

4. The method in accordance with claim 3, wherein the array of acoustic detectors comprises five acoustic detectors in a cruciform formation, the acoustic detectors being coplanar.

5. The method in accordance with claim 1, wherein the processing of the wake samples comprises, for each sample, applying a high-pass filter.

6. The method in accordance with claim 1, wherein the processing of the wake samples comprises, for each sample, deriving a bearing of a plane wave signal to which the respective wake sample corresponds, constructing a vector of bearings and amplitudes versus time, and constructing, from correspondence between bearings and amplitudes versus time, and with respect to the spatial relationship between the microphones, a time-variant bearing estimate for a projectile causal for the wake contribution.

7. The method in accordance with claim 6, wherein the constructing of the bearing estimate comprises forming a matrix describing the spatial relationship between the microphones and, therefrom, forming a pseudoinverse matrix, then correlating the wake samples with respect to each other to determine an integer part of inter-microphone delays and processing phase differences between the wake samples to derive fractional inter-microphone delays, and from said delays determining the bearing estimate.

8. A gunshot detector operable to detect trajectory information on a projectile, the detector comprising:

a plurality of acoustic transducers, arranged in an array in a substantially horizontal reference plane, each transducer being operable to convert acoustic excitations to electrical detection signals; and a signal processor responsive to detecting the existence on said detection signals of an acoustic waveform characteristic of a persistent wake of a subsonic projectile passing on a trajectory nearby, operable to process said detection signals from the acoustic transducers to determine muzzle blast waveforms characteristic of a muzzle blast and to process detected muzzle blast waveforms to determine estimated trajectory information for the projectile.

9. A method of detecting trajectory information for a subsonic projectile, the method comprising:

collecting detection signals from an array of detection microphones, the detection microphones being established in a non co-linear spatial relationship with respect to each other;

determining from at least one of the detection signals the existence of an acoustic waveform, a wake contribution, characteristic of the wake of a subsonic projectile passing on a trajectory nearby;

obtaining a plurality of time samples of the wake contribution over a time period; and processing the plurality of time samples of the wake contribution to determine geometric characteristics of the trajectory of the projectile, wherein the processing of the wake samples comprises, for each sample, deriving a bearing of a plane wave signal to which the respective wake sample corresponds, constructing a vector of bearings and amplitudes versus time, and constructing, from correspondence between bearings and amplitudes versus time, and with respect to the spatial relationship between the microphones, a time-variant bearing estimate for a projectile causal for the wake contribution.

* * * * *